United States Patent [19]

Sano et al.

[11] 4,009,792
[45] Mar. 1, 1977

[54] CARGO CONVEYING APPARATUS ON MOTOR TRUCK

[75] Inventors: Namito Sano; Yu Tsuchiya, both of Kariya, Japan

[73] Assignee: The Coca-Cola Co., Atlanta, Ga.

[22] Filed: Nov. 13, 1975

[21] Appl. No.: 631,585

[52] U.S. Cl. .............................. 214/83.3; 214/518; 214/516
[51] Int. Cl.² ........................................... B60P 3/00
[58] Field of Search .......... 214/518, 519, 517, 516, 214/83.3; 198/218, 221, 223, 225, 181; 254/93 R; 104/162

[56] References Cited
UNITED STATES PATENTS

| | | | |
|---|---|---|---|
| 1,845,313 | 2/1932 | McKinley | 198/221 X |
| 1,928,934 | 10/1933 | Green | 198/181 |
| 3,724,698 | 4/1973 | Weston | 214/518 |
| 3,749,268 | 7/1973 | Macomber et al. | 214/516 |
| 3,802,588 | 4/1974 | Lutz | 214/519 |
| 3,833,139 | 9/1974 | Mahoney | 214/518 |

*Primary Examiner*—Albert J. Makay
*Attorney, Agent, or Firm*—John R. Martin; W. Dexter Brooks; Robert A. Lester

[57] ABSTRACT

A cargo conveying apparatus on a motor truck is described which is capable of moving cargo on the motor truck in a rotational manner by means of a series of conveying mechanisms, and wherein substantially all of the area of the truck bed is utilized without producing a dead space on the motor truck bed while performing loading and unloading operations. The conveying apparatus is characterized by a longitudinal conveying mechanism which consists of a pair of longitudinal rails installed on the floor of the motor truck rear body, a pair of longitudinal feed pawls which are reciprocably installed within the longitudinal rails to convey cargoes only in one direction, and connecting means for reciprocating, in opposite directions, the longitudinal feed pawls, a lateral conveying mechanism which consists of lateral rails installed in the lateral direction at the front end of the aforementioned rear body floor and lateral feed pawls which are reciprocably installed within the lateral rails to convey cargoes only in one direction, an interlock device which interconnects the aforementioned longitudinal conveying mechanisms with the aforementioned lateral conveying mechanism, and a fluid pressure cylinder unit which serves as a power source for driving the aforementioned longitudinal and lateral conveying mechanisms simultaneously through the interlock device.

1 Claim, 16 Drawing Figures

CARGO CONVEYING APPARATUS ON MOTOR TRUCK

BRIEF SUMMARY OF THE INVENTION

The present invention relates to a cargo conveying apparatus mounted on the rear body of a motor truck, whereby cargoes, particularly those which are carried on transporting means, including pallets, of a fixed size are delivered efficiently.

Recently, with the improvement of truck transportation, pallets and containers have become popular for the purpose of labor saving in cargo handling; and this tendency is becoming more and more remarkable. The delivery of cargoes on pallets or in containers on conventional motor trucks, however, has the disadvantage that it is necessary to collect and load empty pallets on the motor trucks after unloading all of the loaded pallets, and moreover if a number of pallets are piled, especially out of order, on the motor truck rear body, it will become very difficult to unload loaded pallets or to load empty pallets at the rear end of the rear body, unnecessarily much time being required before the completion of loading and unloading operations at the destination.

To overcome this disadvantage, the present invention proposes a cargo conveying apparatus comprising a longitudinal conveying mechanism which consists of a pair of longitudinal rails installed on the floor of the motor truck rear body, a pair of longitudinal feed pawls which are reciprocably installed within the longitudinal rails to convey cargoes only in one direction, and connecting means for reciprocating, in opposite directions, the longitudinal feed pawls, a lateral conveying mechanism which consists of lateral rails installed in the lateral direction at the front end of the aforementioned rear body floor and lateral feed pawls which are reciprocably installed within the lateral rails to convey cargoes only in one direction, an interlock device which interconnects the aforementioned longitudinal conveying mechanisms with the aforementioned lateral conveying mechanism, and a fluid pressure cylinder unit which serves as a power source for driving the aforementioned longitudinal and lateral conveying mechanisms simultaneously through the interlock device.

Accordingly, it is an object of the present invention to provide a useful cargo conveying apparatus having the aforementioned longitudinal and lateral conveying mechanisms for conveying cargoes, particularly pallets, in one direction on the motor truck rear body by means of the fluid pressure cylinder, with respective operations interconnected to carry out cargo conveying operation properly in order to ensure most efficient delivery of the cargoes on pallets for the purpose of the saving of labor required in cargo handling.

BRIEF DESCRIPTION OF THE DRAWINGS

Further and additional object and advantages inherent in the present invention using pallets with castors as cargo conveying means will become apparent hereinafter during the detailed description of embodiments of the present invention which is to follow and which embodiments are illustrated in the accompanying drawings forming a part of this specification and wherein:

FIGS. 12(a) – 12(e) illustrate a loading operation wherein cargo is shifted clockwise in six (6) sequential steps 12(a) – 12(e) in a rotational fashion about the truck bed.

DETAILED DESCRIPTION

Figure 1:
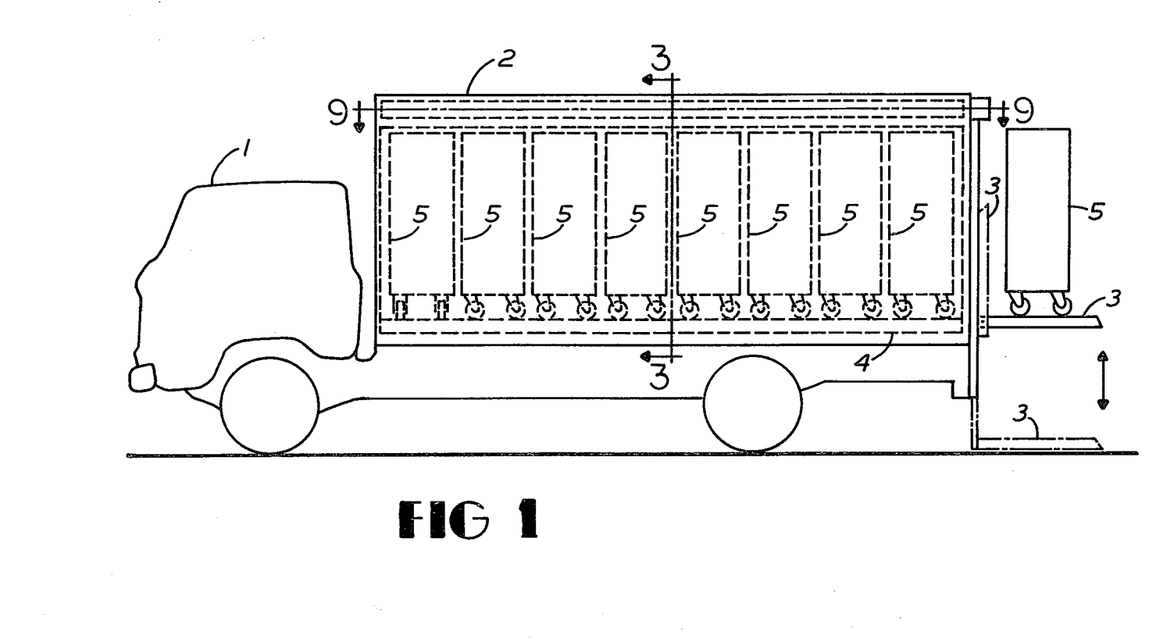
FIG. 1 is a side elevational view of a motor truck equipped with the cargo conveying apparatus of the present invention.
Figure 2:
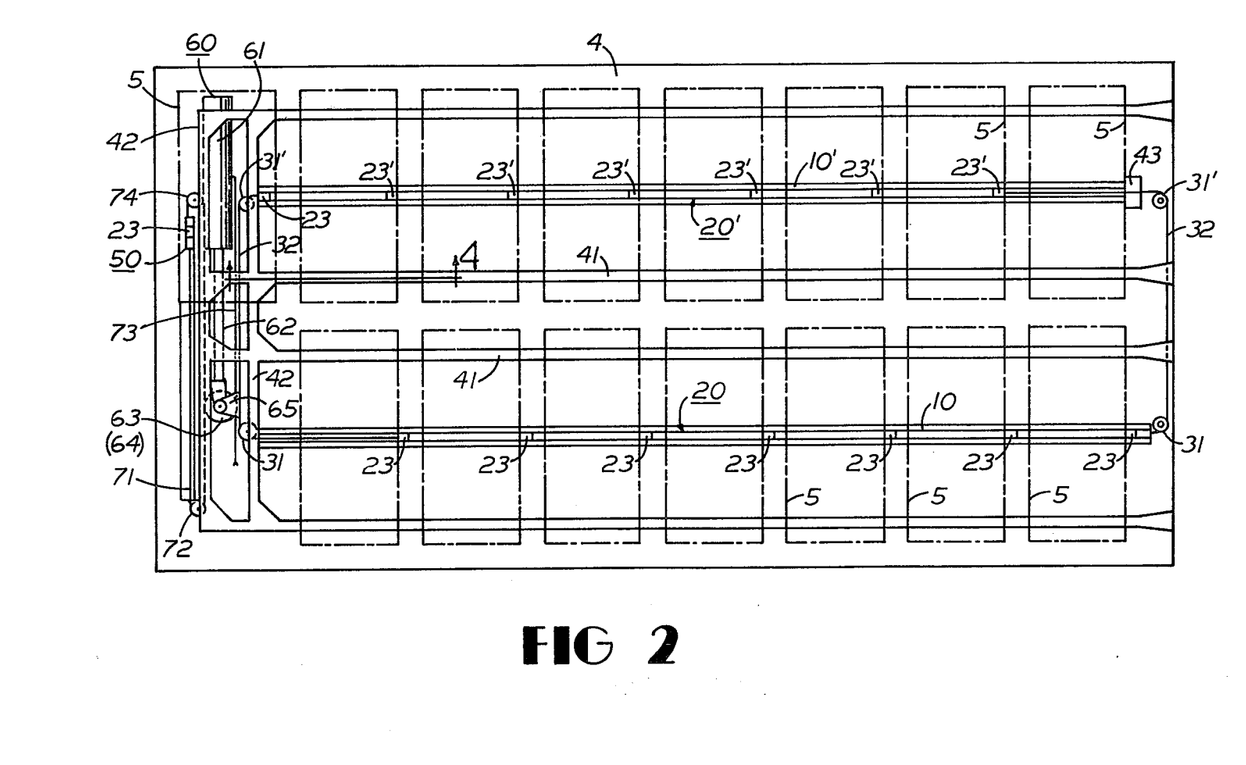
FIG. 2 is a general top plan view of the cargo conveying apparatus.
Figure 8:
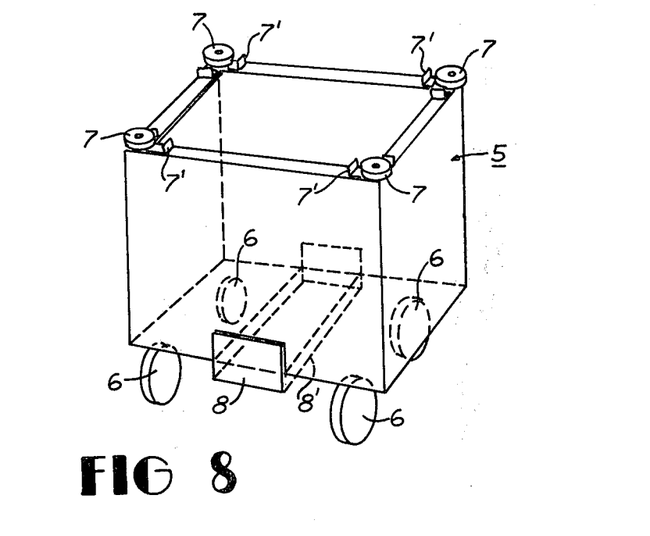
FIG. 8 is a general perspective view of a pallet with castors.
Figure 9:
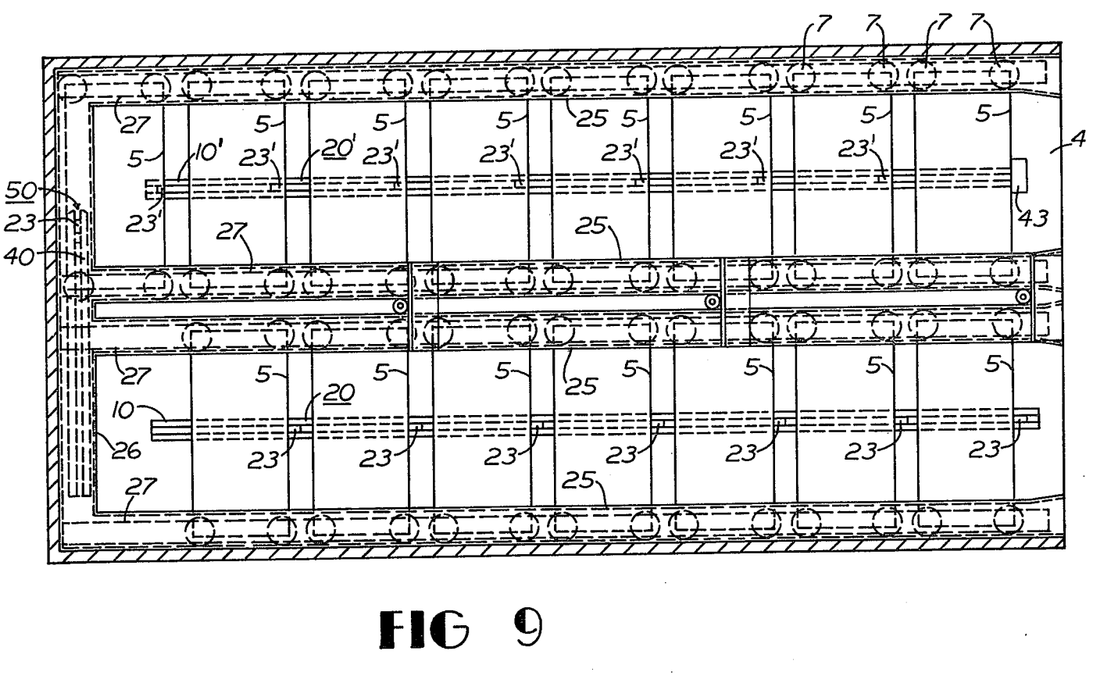
FIG. 9 is a sectional view taken along the line IX—IX of FIG. 1.
Figure 10:
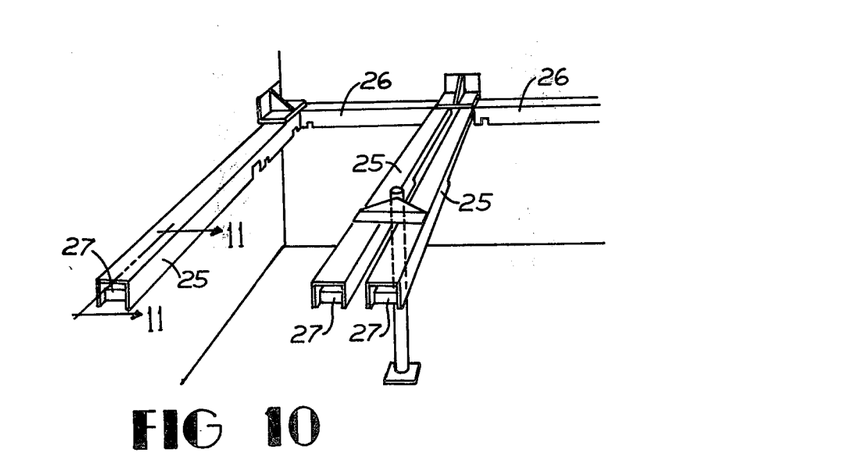
FIG. 10 is a perspective view showing upper guide rails and a pallet holding device.
Figure 11:
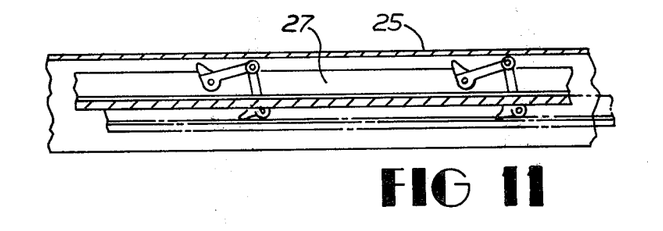
FIG. 11 is an enlarged sectional view taken along the line XI—XI in FIG. 10.
Figure 12:
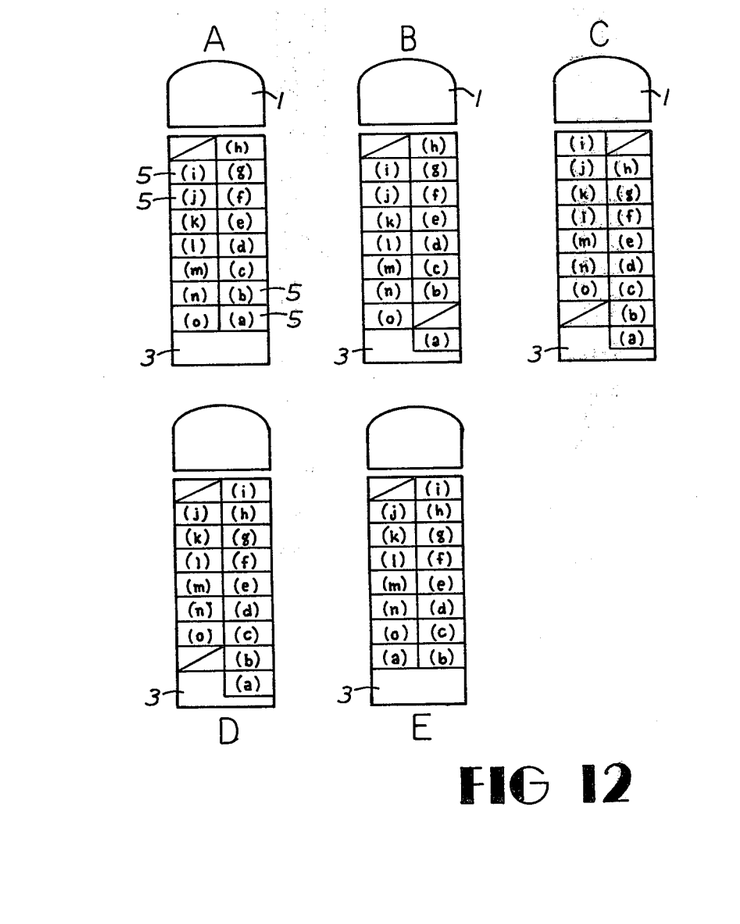
FIG. 12 is a schematic view for explaining a method for conveying the pallets on the rear body floor.

Referring now to the drawing, more particularly to FIG. 1, which shows the first embodiment, there are shown a driver's cab 1 of a motor truck, a panelled rear body 2 mounted on a chassis frame, and a cargo elevator 3 installed at the rear end of the motor truck, which is capable of loading pallets 5 in at least two rows on a floor 4 of the aforementioned rear body 2 as shown by a two-dot chain line in FIG. 2. The pallet 5, as shown in FIG. 8, is a rectangular box-like one having frames on the four sides, castors 6 at four corners on the bottom, rollers 7 at top four corners, pivotably supported on shafts installed at right angles with the bottom, and L-shaped stoppers 7' the both ends of which are bent upwardly nearly at right angles to the stopper plate. At the bottom of the pallet 5, stopper plates 8 are attached on the both long side of the pallet and a stopper plate 8' is attached, nearly parallelly with the short side of the bottom, between the stopper plates 8.

Figure 3:
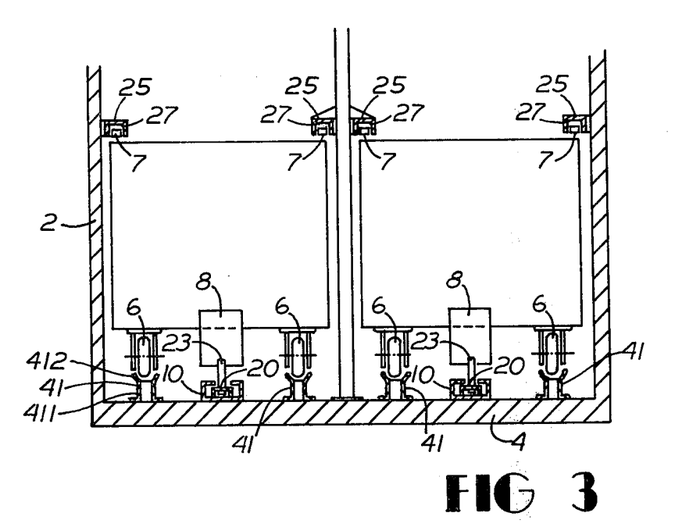
FIG. 3 is a sectional view taken substantially along the line III—III of FIG. 1.
Figure 5:
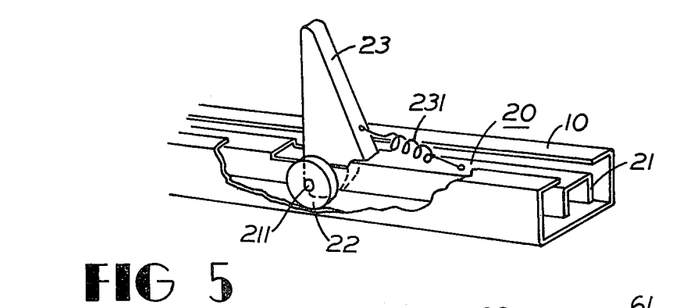
FIG. 5 is a perspective view showing an important part of the conveying apparatus.

On the floor 4, as shown in FIG. 2, FIG. 3 and FIG. 5, longitudinal rails 10 and 10' which have a channel section with the edge of their sides bent inwardly at right angles with the sides, with an opening left at the center, are installed, with the opening up, on the both loading and unloading sides on the floor 4, either located nearly at the center of the pallet 5, at a predescribed distance, ranging from the rear to the front end of the floor. Within the longitudinal rails 10 and 10' are installed channel members 21 and 21' of a channel section with the bottom up and fitted with rollers 22 and 22' rotatably mounted on shafts 211 and 211' present on the frame members so that the members can freely move within the longitudinal rails, and the longitudinal feed pawl units 20 and 20' comprising nearly triangular pawls 23 and 23' the number of which is determined by the number of pallets 5 to be loaded, which are carried on the shafts 211 and 211' installed in the channel members 21 and 21' with their top projecting out of an opening cut in the bottom of the channel members 21 and 21' and which freely swing down and up. The pawl 23' of the longitudinal feed pawl unit 20' faces opposite to the pawl 23 of the other longitudinal feed pawl unit 20. The pawls 23 and 23' are held in a raised position by springs 231 and 231' mounted between the pawls 23 and 23' and the bottom of the channel members 21 and 21'.

Furthermore, the longitudinal feed pawl units 20 and 20' are connected at the both ends by a couple of pulleys 31 and 31' and a cable 32 or a chain, so that they may be moved in directions opposite from each other. The lateral rail 40 having the same section as the longitudinal rail 10 is alterally installed at the front end of the floor of the rear body. Within this lateral rail 40, the lateral feed pawl unit 50 having the same construction as the longitudinal feed pawl units 20 and 20' are movably installed. This pawl unit, however, is fitted with only one pawl 23.

Figure 6:
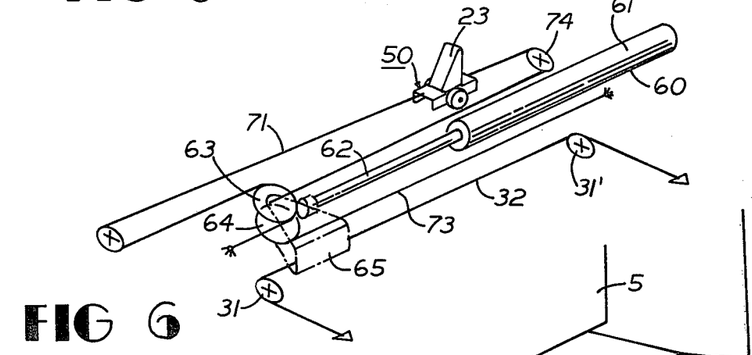
FIG. 6 is a schematic illustration for explaining the hydraulic cylinder unit and the installation of cables.

Meanwhile, the cylinder 61 of the hydraulic cylinder unit 60 is secured on the rear body floor 4, nearly in parallel with the lateral feed pawl unit 50. The two pulleys 63 and 64 are rotatably installed at the forward end of the piston 62. One end of the connecting plate 65 is connected also with the end of the piston 62 and the other end with the cable 32. On the pulley 63, the cable 71 whose one end is secured to the floor 4 is installed as shown in FIG. 6. The other end of the cable 71 is installed on the pulley 72 positioned on a longitudinally extended line of the lateral rail 40, being connected to the lateral feed pawl unit 50. Also, the cable 73, arranged almost symmetrically to the cable 71, is installed on the pulley 74 located opposite to the pulley 72 on the longitudinal extension line of the pulley 64 and the lateral rail 40, its one end being connected with the opposite side of the lateral feed pawl unit 50 and the other end being secured to the rear body floor 4.

Figure 4:
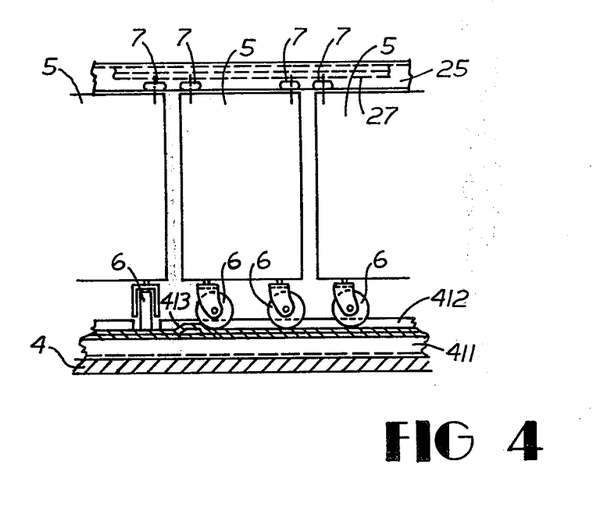
FIG. 4 is a sectional view taken along the line IV—IV of FIG. 2.
Figure 7:
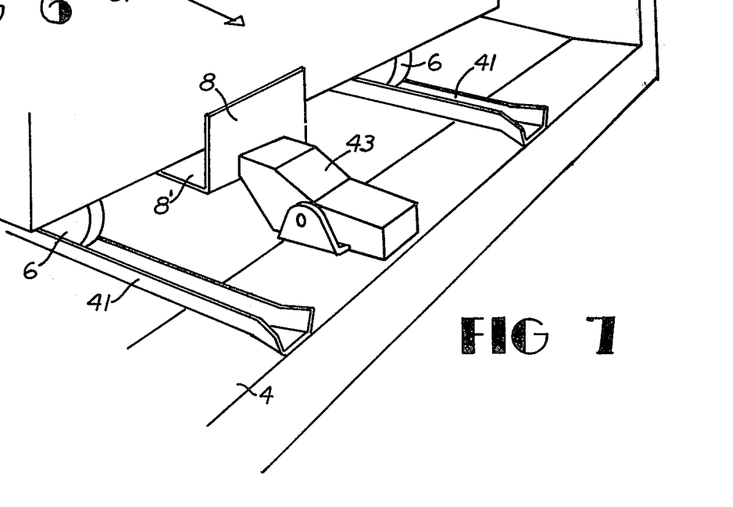
FIG. 7 is a perspective view showing the discharge side of the rear body of the motor truck.

Also, as shown in FIG. 2 to FIG. 4, two pairs of guide rails 41 are installed in the longitudinal direction on the surface of the floor 4 and one pair of guide rails 42 are installed in the lateral direction at the front of the floor 4. The guide rails 41 and 42 are laid respectively with the same space as the castors 6 of the pallet 5; at their intersecting points, the guide rails are formed into a nearly triangular shape to allow easy turning of the castors 6 when the direction of travel of the pallet 5 is changed. The guide rails 41 and 42, as shown in FIG. 3, consists of rail base 411, the channel member 412 having a hat-shaped section to form a channel for the castor, and are installed at a higher level through the length that the floor in order to prevent its interference with the hydraulic cylinder unit 60, the pulleys 63, 64, 72 and 74, and the cables 32, 71 and 73. At the bottom of the front end of the guide rail 41 near the front intersecting point of the channel member 412, as shown in FIG. 4, a projection 413 is provided to maintain an appropriate amount of space to restrict unnecessary motion of the pallet 5 at the time of traversing. Furthermore, the rear end of the guide rail 41 is spread to allow the castors 6 of the pallet 5 to roll into, or out of, the groove with ease. FIG. 7 shows stopper 43 which prevents the pallet 5 from falling off from the end of the unloading side of the rear body and is designed to be manually or automatically disengaged from the stopper plate 8 of the pallet 5 when the pallet 5 is discharged out of the rear body.

Furthermore, as shown in FIG. 4 and FIG. 9 through FIG. 11, the rear body 2 has two pairs of upper longitudinal guide rails 25 and one upper lateral guide rail 26 in which the rollers 7 at the top ends of the pallet 5 rotate. The upper guide rails 25 and 26 have a channel section, with their opening facing down. Within the two pairs of upper longitudinal guide rails are installed pallet holding devices 27 which are vertically movable by means of a linkage, pressing the rollers 7 downward to prevent the pallet 5 from being moved with vibrations or shocks while the motor truck is traveling. The pallet holding devices 27 are so designed as to be operated manually or either electrically or hydraulically.

The mode of operation of the present invention which has been described in the first embodiment is as follows: FIG. 2 shows the hydraulic cylinder unit 60 with its piston 62 fully extended. The pallets 5 are loaded on the floor, leaving space for one pallet unoccupied at the end of the loading side, that is, on the lower side of FIG. 2. (Corresponding to FIG. 12 (a).) In this state, after the pallet 5 at the rear end of the unloading side, that is, on the upper side in FIG. 2, has been discharged (FIG. 12(b)), when the hydraulic cylinder unit 60 is put into operation, the piston 62 contracts to pull the cable 32 to move the longitudinal feed pawl 20 on the unloading side to the right respectively until the stoppers 23 and 23' of the stopper units 20 and 20' come in contact with the stopper plates 8 of the pallet 5, thus moving the pallet 5, from pawl to pawl, within the guide rail 41. Meanwhile, when the hydraulic cylinder unit 60 is operated, the lateral feed pawl unit 50 is pulled by the cable 71, moving downwardly. The pawl 23, being overcome by the force of the spring 231, turns down when it comes in contact with the stopper plate 8' of the pallet 5, not acting on the pallet 5. Accordingly, space is provided at the rear end of the loading side and at the front end of the unloading side (FIG. 12 (c)). Subsequently, when the hydraulic cylinder unit 60 is expanded, all the pawls 23 and 23' of the longitudinal feed pawl units 20 and 20' overcome the springs 231 and 231' and swing down to recover its upright position, not acting on the pallet 5. Meanwhile, the pawl 23 of the lateral feed pawl unit 50 comes in contact with the stopper plate 8' of the pallet 5 at the front (the pallet (j) in FIG. 12 (c)) on the loading side; and as the pallet 5 is moved along the guide rail 42 toward the unloading side; and as the pallet 5 is moved along the guide rail 42 toward the unloading side, recovering the upright position. In this state, there is left space for one pallet either at the front end of the loading side and at the rear end of the unloading side. (FIG. 12 (d).) In this rear spaced on the loading side, an empty pallet (the pallet (a) in FIG. 12(e)) is placed (FIG. 12 (e)). Repeating the above-mentioned operation discharges and reloads all of the pallets on the rear body floor 4, moving the pallets in succession along the rails of the U-shaped arrangement. When the cargo conveying apparatus is not used, for instance during travel or when the motor truck is at a stop, the pallet 5 is held in position by means of the pallet holding device 27. Accordingly, this pallet holding device 27 and the projection 413 provided at the bottom of the guide rail 41 combine to hold the pallet 5 from being moved by vibrations or shocks during travel or with its own weight while the truck is at a stop on a slope.

In this embodiment, the lateral feed pawl unit 50 is connected by the cables 71 and 73 with the hydraulic cylinder unit 60. The feed pawl unit may be recovered by the spring by disconnecting one of the cables.

In the first embodiment of the present invention, the lateral feed pawl unit 50 has twice as long a stroke as the longitudinal feed pawl units 20 and 20'; this stroke may be changed by changing the clamping location of the cables 71 and 73 in accordance with the size and ratio between length and width of the pallet 5.

Subsequently, the second exemplary embodiment of the present invention is described. Means for actuating the longitudinal feed pawl units 20 and 20' and the lateral feed pawl unit 50 by the hydraulic cylinder unit 60 and means for connecting the longitudinal pawl units 20 and 20' with the lateral feed pawl unit 50 differ from those of the first embodiment that is described above. The second embodiment is the same in other respects as the first embodiment of the present invention. Only differences thereof are explained hereinafter.

Figure 13:
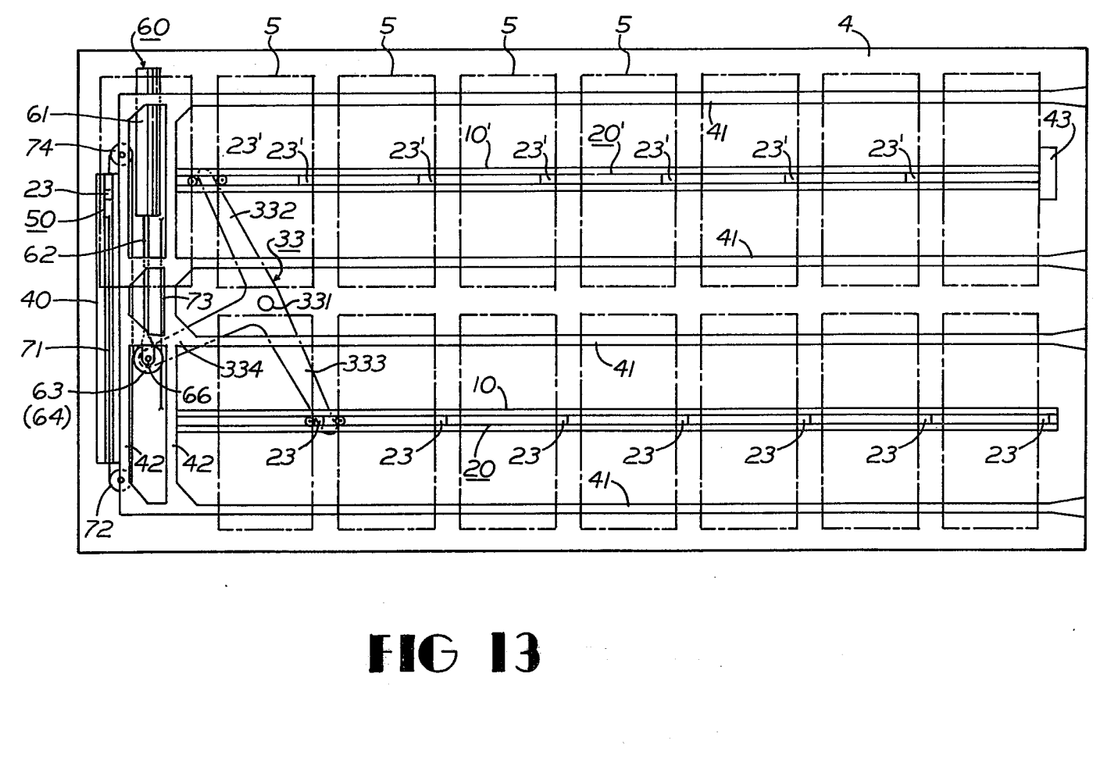
FIG. 13 through FIG. 16 are the same top plan views as FIG. 2, which show the second through fifth embodiments of the present invention.

In the second embodiment shown in FIG. 13, the lateral feed pawl unit 50 is actuated by the cables 71 and 73 installed on the pulleys 63 and 64 mounted at the forward end of the piston 62 of the hydraulic cylinder unit 60. Meanwhile, the longitudinal feed pawl units 20 and 20' are designed to be operated by the T-lever 33, namely the T-lever 33 is rotatably installed on the shaft 331 located at the center between a pair of the longitudinal rails 10 and 10' on the rear body floor 4. The ends of the legs 332 and 333 projecting in opposite directions are fitted between rollers installed in the longitudinal feed pawl units 20 and 20'. In the oblong hole in the end of the other leg 334 is fitted the pin 66 coaxially projecting from the pulleys 63 and 64 at the end of the piston 62 of the hydraulic cylinder unit 60, thus connecting the hydraulic cylinder unit 60 with the longitudinal feed pawl units 20 and 20'.

In the second embodiment thus constructed, when the piston 62 of the hydraulic cylinder unit 60 shown in FIG. 13 is contracted, the cables 71 and 73 installed on the pulleys 63 and 64 are pulled to move the lateral feed pawl unit 50 downwardly, in the Figure, inside the lateral rail 40, and, at the same time, the T-lever 33 turns clockwise on the shaft 331 to move the longitudinal feed pawl unit 20 on the loading side (on the lower side of the Figure) to the left and the longitudinal feed pawl unit 20' on the unloading side (on the upper side of the Figure) to the right, thus moving forward, by the pawls 23 and 23', the pallets 5 on the longitudinal guide rail 41, each from pawl to pawl. Subsequently, when the piston 62 of the hydraulic cylinder unit 60 is extended, the lateral feed pawl unit 50 moves upwardly to actuate the pawl 23, moving the pallet 5 around from the front end of the loading side to the unloading side. At the same time, the T-lever 33 turns counterclockwise on the center of the shaft 331 to restore the longitudinal feed pawl units 20 and 20' to the original position. In this case, however, the pawls 23 and 23' remain in the down position, and herefore do not act toward moving the pallet 5.

As previously stated in the second embodiment, the present invention makes the identical operation as in the first embodiment and the stroke of the longitudinal pawl units 20 and 20' and lateral feed pawl unit 50 may freely be selected by changing the length of the leg 334 of the T-lever 33 which is extending in one direction only. Also, the operating mechanisms may be gathered at the front end of the rear body floor 4, and therefore, no dangerous operating parts are present near the loading and unloading ends of the rear body where workers will work, thus ensuring safe loading and unloading operations.

Figure 14:
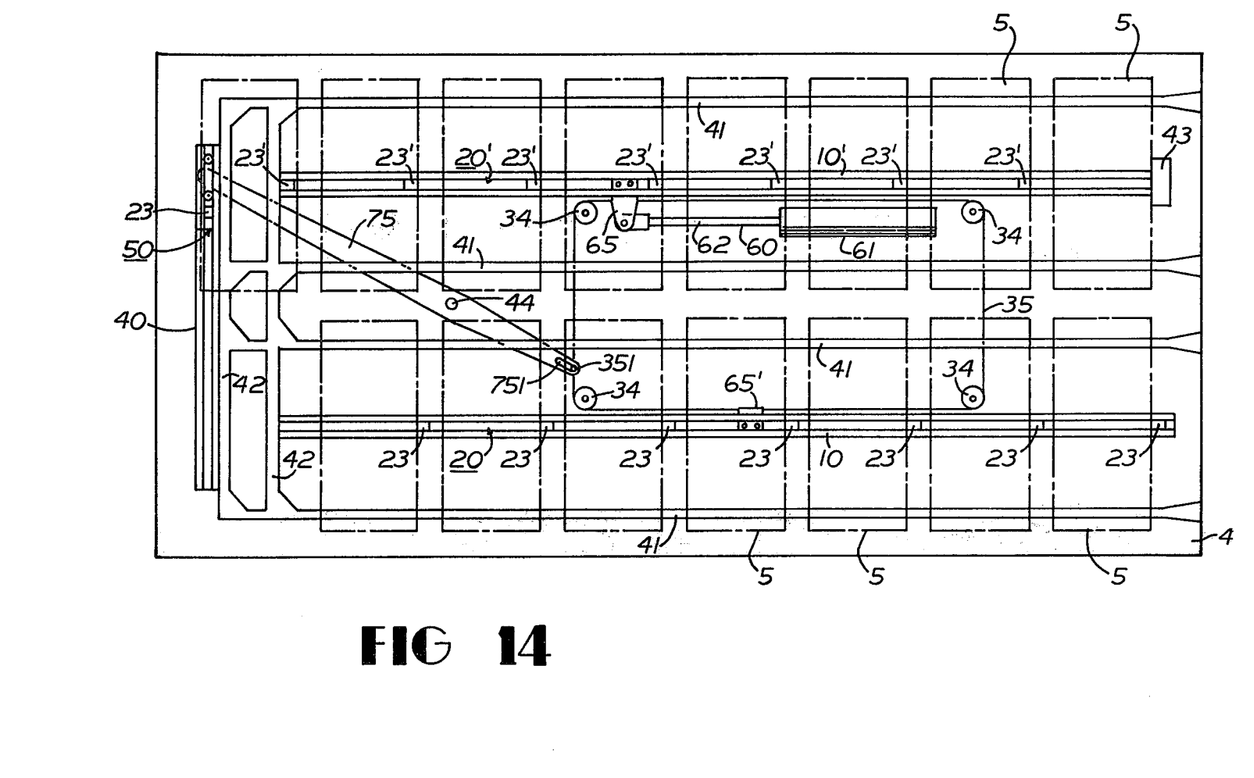

Subsequently, in the third embodiment, the hydraulic cylinder 60, as shown in FIG. 14, is installed in the longitudinal direction along the longitudinal rail 10'. At the forward end of the piston 62, one end of the connecting plate 65 is attached and the other end of the connecting plate 65 is secured to the longitudinal feed pawl unit 20 on the unloading side. The cable 35 arranged in a form of loop on four pulleys 34 and 34' installed along the longitudinal rails 10 and 10' is secured at one point to the connecting plate 65 and further secured at one point by the connecting plate 65' to the longitudinal feed pawl unit 20 on the longitudinal rail 10 on the loading side, thus connecting the both longitudinal feed pawl units 20 and 20'. Meanwhile, at one point of the front lateral part of the cable 35 is a pin 351 which is engaged in the oblong hole 751 made in one end of the lever 75 rotatably supported on the shaft 44 protuberantly installed on the floor. The other end of the lever 75 is fitted between two rollers installed on the lateral feed pawl unit 50, thus connecting the lateral feed pawl unit 50 with the longitudinal feed pawl units 20 and 20'.

In this embodiment, the present invention having the longitudinal feed pawl units 20 and 20' directly connected with the hydraulic cylinder unit 60 and the lateral feed pawl unit 50 interconnected with a pair of longitudinal feed pawl units 20 and 20' through the cable 35 and the lever 75, makes the identical operations as in the first and second emodiments that have been previously described.

Figure 15:
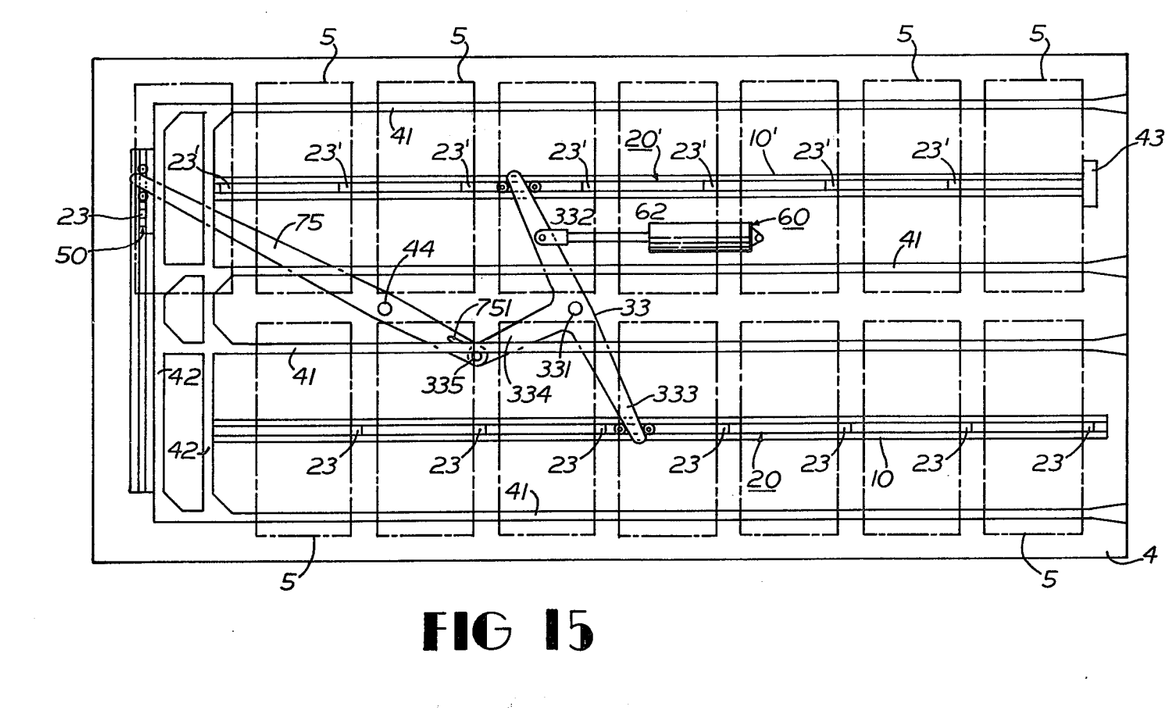

FIG. 15 is the fourth embodiment of the present invention, showing a combination of the levers previously described in the second and third embodiments through which the longitudinal feed pawl units 20 and 20' and the lateral feed pawl unit 50 are operated. As in the third embodiment, the hydraulic cylinder unit 60 is installed longitudinally along the longitudinal rail 10 on the unloading side; the T-lever 33 is rotatably supported at the center on the shaft 331 located on the floor, with either or its legs 332 and 333 being fitted between a couple of rollers installed on the longitudinal feed pawl units 20 and 20'; and the forward end of the piston 62 of the cylinder unit 60 is connected to the leg 332. The other leg 334 of the T-lever 33 carries a projecting pin 335, which is fitted in the oblong hole 751 made in one end of the lever 75 rotatably supported by the shaft 44 on the floor. The other end of the lever 75 is inserted between the two rollers installed on the lateral feed pawl unit 50, so that the longitudinal feed pawl units 20 and 20' are operated in mechanical connection with the lateral feed pawl unit 50 by actuating the hydraulic cylinder unit 60.

Namely, in FIG. 15, when the hydraulic cylinder unit 60 is contracted, the T-lever 33 turns clockwise on the center of the shaft 331 to move leftward the longitudinal feed pawl unit 20 on the loading side and rightward the longitudinal feed pawl unit 20' on the unloading side end, at the same time, to turn the lever 75 counterclockise on the center of the shaft 44. When the lever 75 is turned counterclockwise, the lateral feed pawl unit 50 moves downwardly. Reversely, a reverse operation is done to extend the hydraulic cylinder unit 60.

According to this fourth embodiment, all kinds of operations of this apparatus are exactly performed by means of the levers 33 and 75 and therefore there is no necessity of worrying about elongation of the cables or chains, which have sufficient durability. The ratio of the stroke of the lateral feed pawl unit 50 and the longitudinal feed pawl units 20 and 20' can freely be selected, according to the size of the pallet 5 and the size of the truck rear body floor 4, by selecting the suitable length of the levers 33 and 75. Furthermore, the hydraulic cylinder unit 60 may be installed in the operating position shown in FIG. 15 where the cylinder unit having the piston 62 with a short stroke wll do. The cylinder unit 60, however, may be installed in any other position of the legs 332 and 333 of the T-lever 33 in accordance with load and stroke and also the hydraulic cylinder unit 60 may be installed in the lateral direction, with the forward end of the piston 62 connected to the connection between the T-lever 33 and the lever 75.

Figure 16:
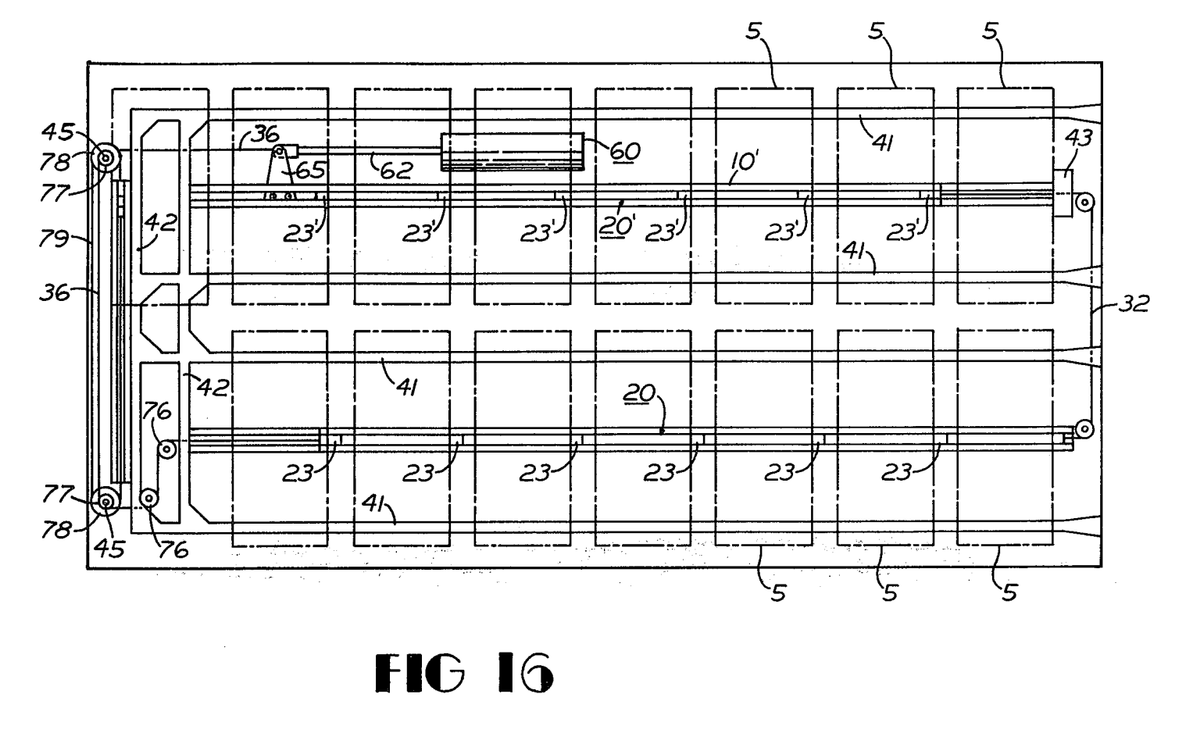

Furthermore, in the fifth embodiment shown in FIG. 16, the hydraulic cylinder unit 60 is longitudinally installed along the longitudinal rail 10' on the unloading side and the forward end of the piston 62 is connected by the connecting plate 65 with the longitudinal feed pawl unit 20' on the unloading side. At the forward end of the piston 62, one end of the chain 36 is connected; the chain 36 is extended forward and installed on small chain sprockets 77 rotatably carried on shafts 45 protruding vertically and almost symmetrically nearly at the front end of the floor and further on freely rotating chain sprockets 76; and the other end of the chain 36 being connected with the front end of the longitudinal feed pawl unit 20 on the loading side. The rear ends of the longitudinal feed pawl units 20 and 20' are connected with each other by the cable 32. Meanwhile, the chain 79 with its one end connected to the right end (the upper end in FIG. 16) of the lateral feed pawl unit 50 and with the other end connected to the left end (the lower end in FIG. 16) of the lateral feed pawl unit 50, is installed on the large chain sprocket 78 which is coaxially installed and rotates together with the small chain sprocket 77.

To explain the operation of the fifth embodiment thus constructed, when the piston 62 of the hydraulic cylinder unit 60 shown in FIG. 16 is shortened from the fully extended position, the longitudinal feed pawl unit 20' on the unloading side moves rightward in the Figure and at the same time the longitudinal feed pawl unit 20 on the loading side is pulled by the chain 36, moving leftward. As the chain 36 moves, the aforementioned small chain sprocket 77 and large chain sprocket 78 turn clockwise simultaneously, and the chain 79 connected with the lateral feed pawl unit 50 also moves to cause the lateral feed pawl unit 50 to move downwardly in the Figure. Subsequently, when the hydraulic cylinder unit 60 is extended, the longitudinal feed pawl unit 20' on the unloading side moves leftward while the longitudinal feed pawl unit 20 on the loading side, being pulled by the cable 32, moves rightward. At the same time, the large chain sprocket 78 makes a counterclockwise turn to move the lateral feed pawl unit 50 upward. Repeating the aforementioned operation conveys the pallets 5 in succession of the U-shaped rails.

In this embodiment, the large chain sprocket 78 twice as large in diameter as the small chain sprocket 77 is used in order to provide a ratio of 1 to 2 between the stroke of the longitudinal feed pawl units 20' and that of the lateral feed pawl unit 50. This ratio can be freely changed by selecting a suitable ratio between the diameter of the large chain sprocket 78 and that of the small chain sprocket 77.

The first through fifth embodiments have been described in detail. In short, the truck cargo conveying apparatus of the present invention is equipped with one fluid pressure cylinder unit, whereby a pair of the longitudinal conveying mechanisms installed in the longitudinal direction and one lateral conveying mechanism installed in the lateral direction at the front end of the floor are operated at the same time; each stroke of the piston of the aforementioned fluid cylinder unit advances cargoes in succession on the U-shaped rails, thus accomplishing loading and unloading operations most efficiently.

The fluid pressure cylinder unit actuates both the longitudinal and lateral conveying mechanisms; that is, when the piston of the fluid pressure cylinder unit strokes in one direction, the pawl of the longitudinal conveying mechanism is actuated to move the cargoes forward or backward and when the aforementioned piston strokes in the other direction, the pawl of the lateral conveying mechanism is actuated to carry the cargoes in the lateral direction. Therefore, the present invention does not require that the longitudinal and lateral conveying mechanisms be operated separately; and besides since each stroke of the piston of the fluid pressure cylinder unit be utilized effectively, most efficient loading and unloading operations will be ensured.

The cargo conveying apparatus of the present invention allows easy delivery of cargoes on a number of pallets or on other means for conveying the cargoes to a plurality of consignees; that is, cargoes on pallets or other means for conveying the cargoes are mounted on the rear body in the order of delivery to consignees and, at each consignee, the pallets are unloaded from the unloading side of the rear body while empty pallets are loaded on to the loading side efficiently and without confusion and promptly with extremely little man power.

In addition, the cargo conveying apparatus, being of a relatively simple construction, can easily be mounted on the convention motor truck rear body; and since cargoes can be carried on the U-shaped rails on the rear body floor, most effective use of the floor is ensured without adversely affecting the loading efficiency. Also, when the rear body is not fully loaded with pallets, for example with space for a few pallets left unoccupied, the loaded pallets can be moved with the space left as it is.

Furthermore, as shown in FIG. 1, loading and unloading operations will be accomplished most effectively by using together the load elevator system mounted at the rear end of the rear body.

Although a preferred embodiment of the present invention has been illustrated and described herein it will be understood that the present invention is susceptible of various modifications and adaptations within the scope of the appended claims.

The embodiment of the invention in which an exclusive property right or privilege is claimed are defined as follows

We claim:

1. A cargo conveying apparatus on a motor truck comprising a motor truck having a cargo carrier truck bed, a series of conveying mechanisms being provided on the truck bed for transporting a movable cargo fore and aft to the longitudinal axis of the motor truck by virtue of a longitudinal conveying means which includes a pair of longitudinal rails installed on the truck bed, a pair of longitudinal feed pawls which are reciprocably installed within the longitudinal rails to convey cargoes only in one direction, and connecting means for reciprocating, in opposite directions, the longitudinal feed pawls, a lateral conveying mechanism which consists of lateral rails installed in the lateral direction at the front end of the truck bed and lateral feed pawls which are reciprocably installed within the lateral rails to convey cargoes only in one direction, said lateral feed pawls being provided with twice as long a stroke as the longitidinal feed pawls and wherein driving means are provided for driving said longitudinal and lateral conveying mechanisms simultaneously by virtue of the interlock device and further wherein the driving means comprises a fluid pressure cylinder unit which serves as a power source for driving said longitudinal and lateral conveying mechanisms simultaneously by virtue of the interlock device, and further wherein the fluid pressure cylinder unit is installed longitudinally along the longitudinal rails on the unloading side of the motor truck and wherein a T-lever interlock device is rotatably supported at the center of the truck bed on a shaft located on the floor, with either of its legs being fitted between a couple of rollers installed on the longitudinal feed pawls, and further wherein the forward end of a piston of the fluid pressure cylinder unit is connected to said legs, with the other leg of the T-lever carrying a projected pin, which is fitted in the oblong hole made in one end of the T-level rotatably supported by said shaft on the truck bed floor, all of which conveying mechanisms cooperate together to move cargo in a rotational manner about the truck bed by virtue of said interlock device which interconnects the said longitudinal conveying mechanism with said lateral conveying mechanism, and wherein pallet means are provided for transporting said movable cargo fore and aft to the longitudinal axis of the motor truck, said pallet means comprising a rectangular box member having frames on the four sides, castors at four corners on the bottom of the box member, rollers at the top four corners of the box member, all of said castors being pivotally supported on shafts and installed at right angles with the box member, and further wherein L-shaped stoppers are provided at both ends of the pallet means, and wherein said guide rails are laid and positioned on the truck bed respectively with the same spacing as the distance between the castors of said pallet means, and further wherein the intersecting points of said guide rails are formed into a nearly triangular space to allow easy turning of the castors when the direction of travel of the pallet means is changed, whereby a more efficient loading and unloading operation is provided in conjunction will all of the area of the truck bed without producing a dead space on the truck bed.

* * * * *